United States Patent [19]
Brittenham et al.

[11] Patent Number: 5,905,486
[45] Date of Patent: May 18, 1999

[54] MOBILE CLIENT COMPUTER PROGRAMMED TO COMBINE CURSOR, CONTROL AND INPUT FUNCTIONS

[75] Inventors: Peter James Brittenham, Apex, N.C.; Liam David Comerford, Carmel, N.Y.

[73] Assignee: International Business Machines Corporation, Armonk, N.Y.

[21] Appl. No.: 08/807,969

[22] Filed: Mar. 3, 1997

[51] Int. Cl.⁶ .................................................. G06K 9/00
[52] U.S. Cl. .................... 345/157; 345/145; 345/173; 345/179; 382/187; 707/507; 707/541
[58] Field of Search .................... 345/145, 157, 345/173, 179; 382/185–190; 707/507, 541

[56] References Cited

U.S. PATENT DOCUMENTS

| | | | |
|---|---|---|---|
| 4,860,372 | 8/1989 | Kuzunuki et al. | 382/13 |
| 5,086,385 | 2/1992 | Launey et al. | 364/188 |
| 5,121,478 | 6/1992 | Rao | 395/157 |
| 5,148,155 | 9/1992 | Martin et al. | 340/712 |
| 5,157,737 | 10/1992 | Sklarew | 382/13 |
| 5,185,857 | 2/1993 | Rozmanith et al. | 395/148 |
| 5,243,697 | 9/1993 | Hoeber et al. | 395/156 |
| 5,250,929 | 10/1993 | Hoffman et al. | 345/146 |
| 5,298,890 | 3/1994 | Kanamaru et al. | 345/157 |
| 5,307,456 | 4/1994 | MacKay | 395/154 |
| 5,339,393 | 8/1994 | Duffy et al. | 395/161 |
| 5,386,568 | 1/1995 | Wold et al. | 395/700 |
| 5,388,993 | 2/1995 | McKiel et al. | 434/188 |
| 5,408,601 | 4/1995 | Nakamura et al. | 395/155 |
| 5,430,836 | 7/1995 | Wolf et al. | 395/155 |
| 5,459,796 | 10/1995 | Boyer | 382/187 |
| 5,598,183 | 1/1997 | Robertson et al. | 345/145 |
| 5,646,649 | 7/1997 | Iwata et al. | 345/173 |

FOREIGN PATENT DOCUMENTS

| | | | |
|---|---|---|---|
| 5 41236 | 5/1993 | European Pat. Off. | G06F 3/033 |
| 5 41237 | 5/1993 | European Pat. Off. | G06F 3/33 |
| 6 36974 | 2/1995 | European Pat. Off. | G06F 9/46 |
| 4-157528 | 5/1992 | Japan | G06F 9/06 |

OTHER PUBLICATIONS

IBM TDB Article; *New Elements for a Graphical User Interface* vol. 38 No. 05 May 1995.
IBM TDB Article; *Calculating the Insertion Point for Dragged Text Dropped on a Presentation Manager Entry Field;* vol. 37 No. 09 Sep. 1994.

*Primary Examiner*—Mark K. Zimmerman
*Assistant Examiner*—Vincent E. Kovalick
*Attorney, Agent, or Firm*—Bernard D. Bogdon; Daniel E. McConnell

[57] ABSTRACT

The present invention contemplates a display generating system, preferably a computer such as a mobile client system, in which text entry to supply data for a defined field in a form or the like is facilitated. In particular, the present invention contemplates combining certain functions heretofore separated in a display which accepts data entry such as letters or numbers entered by hand using a stylus or the like. In a system implementing this invention, the functions of providing a cursor which indicates the location for data entry and providing a field displaying or receiving data entry are combined. By this combination, the field receiving or displaying an entry is positioned immediately adjacent the displayed field for such entry, permitting a user to focus attention on a single location in the display as distinguished from dividing attention between a location at which a cursor prompts for data to appear and a separated field at which the entry is entered or displayed.

19 Claims, 10 Drawing Sheets

FIG. 8

Candida Form

Main | Back

Candida Bloodstream Infections Multicenter Study

Center: 12
Date of Birth: 04-29-54
Date of Admission: 04-29-54
Primary ICd9:

Hospital Number: 123456789
Male ○  ○ Female
Date Admission ICU: 04-29-54
Secondary ICd9:

Record 1 of 6

Date of Surgery
Minutes
ASA Score

Type: Access Procedure
Anesthesia:
Class: Clean-contaminated
Urgency:

MOBILE CLIENT COMPUTER PROGRAMMED TO COMBINE CURSOR, CONTROL AND INPUT FUNCTIONS

RELATED APPLICATIONS

This application is one of a series of related applications assigned to common ownership. Other applications in the series include:

Application Ser. No. 08/781,004 filed Jan. 9, 1997, entitled "Mobile Client Computer with Keyboard Interface" with named inventors T. Aebli, B. Miller and W. W. Vetter;

Application Ser. No. 08/703,171 filed Aug. 22, 1996, entitled "Mobile Client Computer Programmed to Predict Input" with named inventors R. L. Bertram, D. F. Champion and P. Brittenham;

Application Ser. No. 08/708,168 filed Aug. 22, 1996, entitled "Mobile Client Computer Programmed to Exchange Lists of Predicted Input" with named inventors R. L. Bertram and W. T. Oldfield;

Application Ser. No. 08/814,034 filed Mar. 10, 1997, entitled "Mobile Client Computer Interacting with Docking Device" with named inventors E. H. Booth, B. A. Carpenter, R. B. Ferrier, R. A. Resnick and W. W. Vetter;

Application Ser. No. 08/706,990 filed Aug. 22, 1996, entitled "Mobile Client Computer Programmed to Copy Lists of Predicted Input" with named inventors R. L. Bertram, P. J. Brittenham and D. F. Champion;

Application Ser. No. 08/963,475 filed Nov. 3, 1997, entitled "Mobile Client Computer with Battery Charging Control" with named inventors C. Burroughs, B. A. Carpenter, G. O'Neil and R. A. Resnick;

Application Ser. No. 08/813,148 filed Mar. 7, 1997, entitled "Mobile Client Computer Programmed for Systems Message Display" with named inventors R. L. Bertram and D. F. Champion;

Application Ser. No. 08/960,914 filed Oct. 30, 1997, entitled "Mobile Client Computer Programmed with Broswer Function" with named inventors R. L. Bertram and D. F. Champion;

Application Ser. No. 08/813,522 filed Mar. 7, 1997, entitled "Mobile Client Computer Programmed to Process Table Displays" with named inventor R. L. Bertram;

Application Ser. No. 08/813,527 filed Mar. 3, 1997, entitled "Mobile Client Computer Programmed to Display Drop Down Scrolling Indicator" with named inventors R. L. Bertram and D. F. Champion;

Application Ser. No. 08/813,521 filed Mar. 7, 1997, entitled "Mobile Client Computer Programmed to Hide Empty Table Elements" with named inventor R. L. Bertram;

Application Ser. No. 08/959,997 filed Oct. 29, 1997, entitled "Mobile Client Computer with Integrated Cellular Telephone" with named inventors B. A. Carpenter, P. Lee, M. Noll and R. Reiland;

Application Ser. No. 08/700,608 filed Aug. 12, 1996, entitled "Mobile Client Computer Programmed to Display Hexagonal Keyboard" with named inventors R. L. Bertram, D. F. Champion and L. S. Eichorn;

Application Ser. No. 08/700,606 filed Aug. 12, 1996, entitled "Mobile Client Computer Programmed to Establish Soft Keyboard Targeting" with named inventor R. L. Bertram; and Application Ser. No. 08/706,991 filed Aug. 22, 1996, entitled "Mobile Client Computer Programmed to Display Lists and Hexagonal Keyboard" with named inventors R. L. Bertram and D. F. Champion.

BACKGROUND OF THE INVENTION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are the personal computer systems offered by IBM and identified as the PERSONAL COMPUTER AT, PERSONAL SYSTEM/2, PS/1, Aptiva, and the like. Persons of skill in the computer arts will be familiar with these systems.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. The Family I models originally used the popular INTEL 8088 or 8086 microprocessor as the system processor. These processors have the ability to address one megabyte of memory. The Family II models typically used the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors. As the state of the art has progressed, Family I systems have developed toward ever higher capability central processor units, including the Intel PENTIUM brand microprocessor and its competitors, Reduced Instruction Set Computing (RISC) microprocessors such as the IBM and Motorola Power PC processors, and higher capability bus designs such as VESA and PCI bus designs. Again, persons of skill in the computer arts will be familiar with these systems.

The impact of such development on the manner in which computing is done in business and consumer environments has been profound. Prior to the development of personal computer systems, most use of computers was for business purposes only and data processing was done in the "glass house" which housed the computer system. Inquires were channeled through information managers for handling by computer technicians. With the wide spread use of personal computer systems access to data once maintained on an enterprise wide computer system became important to managers and ultimately line employees. Networks of personal computer systems grew up, with layered access through network servers to the enterprise systems or mainframes on which enterprise data is stored.

As information work has spread to an increasing number of information workers and impacted the work of more wide spread groups of employees within an enterprise, need for mobility of such employees has arisen. Particularly in such "outside" jobs as route salesperson, transport driver, or business consultant, it has become important to have access, while remote from an enterprise site, to enterprise data normally maintained on an enterprise system and accessed through a network of computer systems. Such access has been achieved, in part, through the use of wireline connected personal computer systems such as notebook or laptop computer systems. Typically, such a system may be equipped with a modem and communications software such that, when connected to a public switched telephone network (PSTN), the system may be connected with a supporting server or mainframe and a user may gain access to desired data.

With the development of radio communications such as exemplified by the cellular telephone networks, the possibility arose of eliminating the wireline connection between a personal computer system and a supporting server. Such systems have been developed, particularly for systems used in retail and warehousing businesses, which permit a user to move freely within an area which has radio transceiver service while remaining in intermittent or continuous contact with a data channel through which data may be exchanged with a server or mainframe supporting an enterprise activity. For purposes of discussion here, such systems in the hands of user will be referred to as "mobile client systems". A mobile client system is distinguished by the mobility of the user, who is free of the restraints against movement imposed by a wireline connection, and by the client nature of the system in that enterprise data accessed by the mobile client system is maintained on a server or mainframe computer system with which the mobile client is in communication. Such mobile client systems are also sometimes referred to as personal communications assistants or personal digital assistants. The interested reader is referred to "Wireless: The Revolution in Personal Telecommunications" by Ira Brodsky (Artech House, Boston, 1995) for additional background and information about mobile client systems.

SUMMARY OF THE INVENTION

With the foregoing as background, the present invention contemplates a mobile client system in which text entry to supply data for a defined field in a form or the like is facilitated. In particular, the present invention contemplates combining certain functions heretofore separated in a display which accepts data entry such as letters or numbers entered by hand using a stylus or the like. Systems enabling such data entry are commonly known as having handwriting recognition capability. Thus the present invention is an enhancement of handwriting recognition implemented through a new arrangement of a display.

In realizing a system implementing this invention, the functions of providing a cursor which indicates the location for data entry and providing a field displaying or receiving the scribed or handwritten entry are combined. By this combination, the field receiving or displaying the scribed entry is positioned immediately adjacent the displayed field for such entry, permitting a user to focus attention on a single location in the display as distinguished from dividing attention between a location at which a cursor prompts for data to appear and a separated field at which the entry is entered or displayed.

BRIEF DESCRIPTION OF THE DRAWINGS

Some of the purposes of the invention having been stated, others will appear as the following description proceeds, when taken in connection with the accompanying drawings, in which:

FIG. 8 is an illustration of the display screen of the mobile client of FIG. 2 while driven by the execution of an application program on the mobile client to display certain data;

FIG. 9 is a view similar to FIG. 8 showing an overlain window for text entry and including a display element showing the recognition of a letter entry by handwriting; and FIG. 10 is a view similar to FIGS. 8 and 9 showing the overlain window as displaced following acceptance of entry of the letter shown in FIG. 9.

DESCRIPTION OF THE PREFERRED EMBODIMENT(S)

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
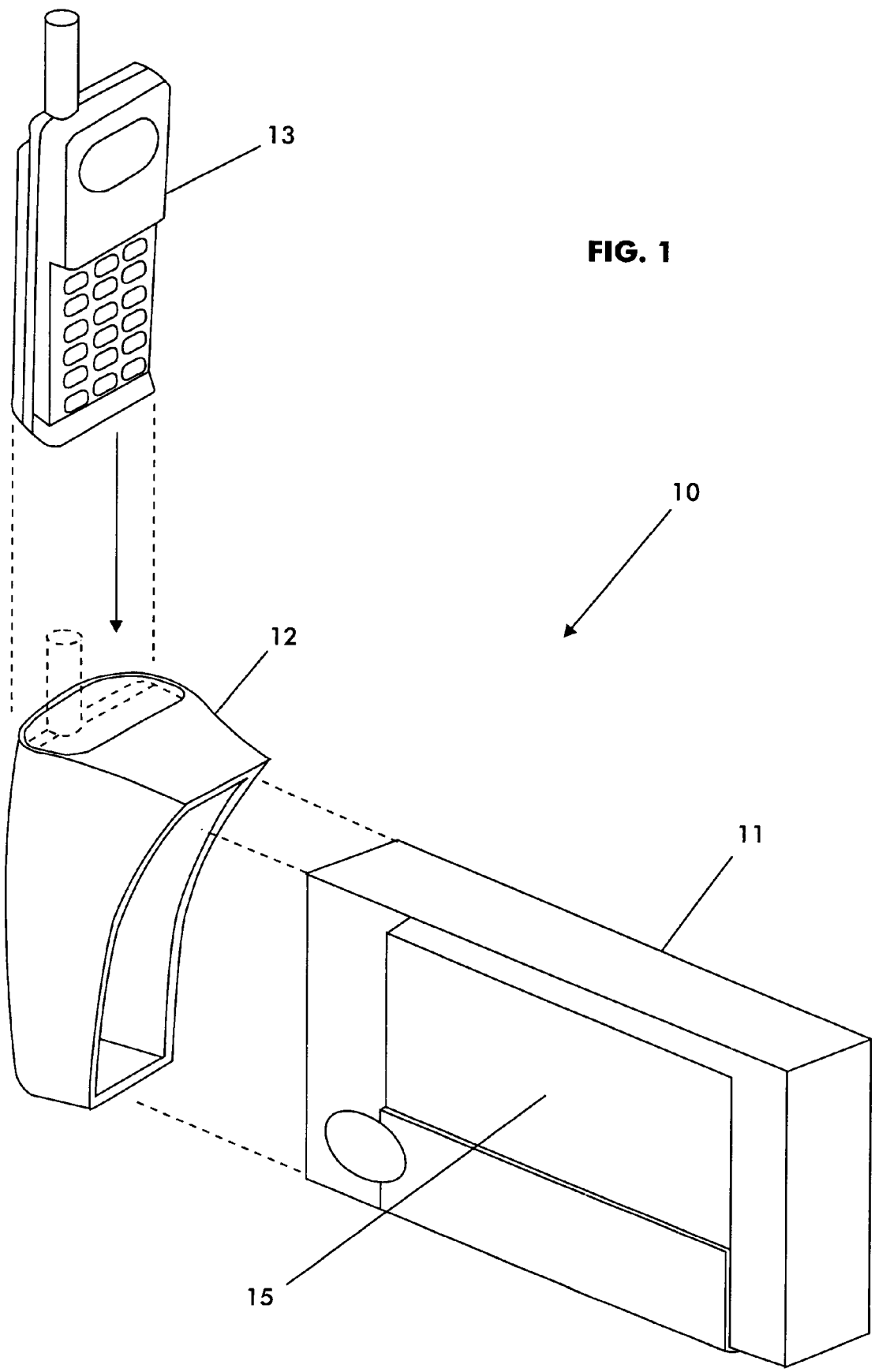
FIG. 1 is an exploded perspective view of certain elements of a mobile client computer system in accordance with this invention.
Figure 2:
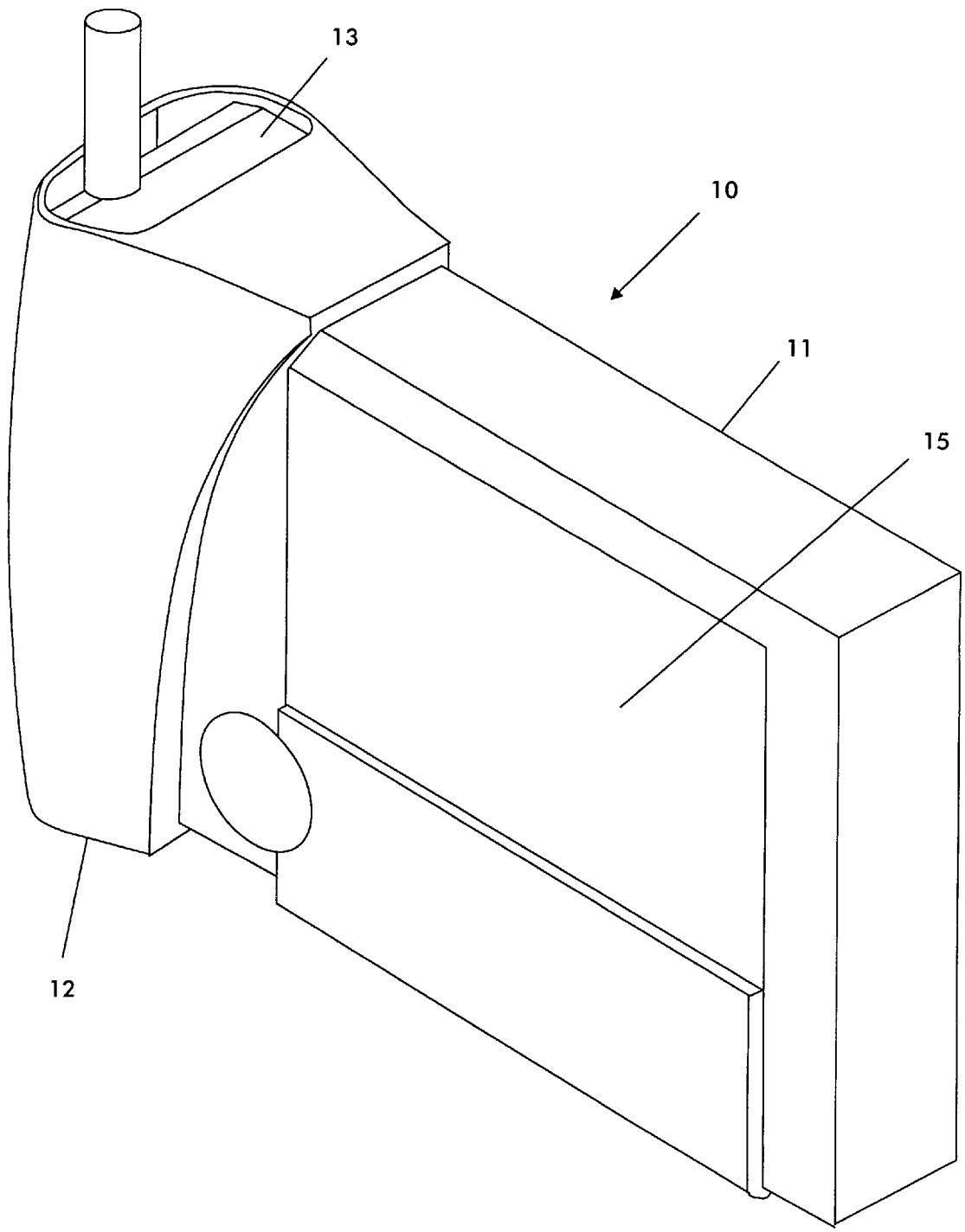
FIG. 2 is a perspective view of the mobile client system of FIG. 1 as assembled for use.

Referring now more particularly to the accompanying Figures, FIGS. 1 and 2 illustrate an exemplary embodiment of a mobile client personal computer system (herein also called a "mobile client") in accordance with this invention and indicated generally at 10. As will become more clear from the description which follows, the mobile client may have a variety of characteristics while remaining within the contemplation of this invention. Central among those characteristics is that the system have provision for the capability of communicating at least data, possibly both data and audio such as voice, between the mobile client system and supporting servers and mainframes. In the illustrated embodiment, such capability is provided by providing a system which is separable into three distinct components, namely a system tablet 11, a holster 12 and a radio transceiver 13. In the form illustrated, the transceiver 13 is a cellular telephone which may be mounted within the holster 12, while the holster 12 may be connected with the system tablet 11 by slipping the tablet into a receptacle provided in the holster 12. While thus illustrated and here described as a three component system, it will be understood that many of the advantages of this invention as described hereinafter can be realized where the mobile client system 10 is unified.

That is, where the radio transceiver 13 is integrated with the system tablet 11 and the connection therebetween is accomplished within a single cover for the system, apart from any use of a holster 12. The transceiver/holster/tablet organization provides certain advantages in some circumstances. However, it is to be understood that the invention can be practiced apart from this particular organization.

An advantage realizable with the tripartite organization is the ready substitution of one radio transceiver for another. More particularly, while digital data and analog audio can be exchanged over a cellular telephone radio interface, with data using cellular digital packet data (CDPD) protocols, there are other possibilities. Among them can be digital radio techniques such as frequency division multiple access (FDMA) and time division multiple access (TDMA); spread spectrum technologies such as direct sequence spread spectrum (DS-SS) and resultant code division multiple access (CDMA); frequency hopping spread spectrum (FH-SS); and the combination of one of more of these technologies into what are known as advanced mobile phone systems (AMPS) or advanced radio data information service (ARDIS) or RAM Mobile Data. As these technologies evolve and gain wider acceptance, the tripartite organization will facilitate adapting existing tablets 11 to emerging radio transceivers 13, and thereby protect the investment of users in systems. However, for certain environments such as adverse ambient conditions of temperature, humidity, or exposure to shock as by dropping, a unified system with transceiver and tablet and supporting circuitry in a single cover may be a preferred choice.

Figure 3:
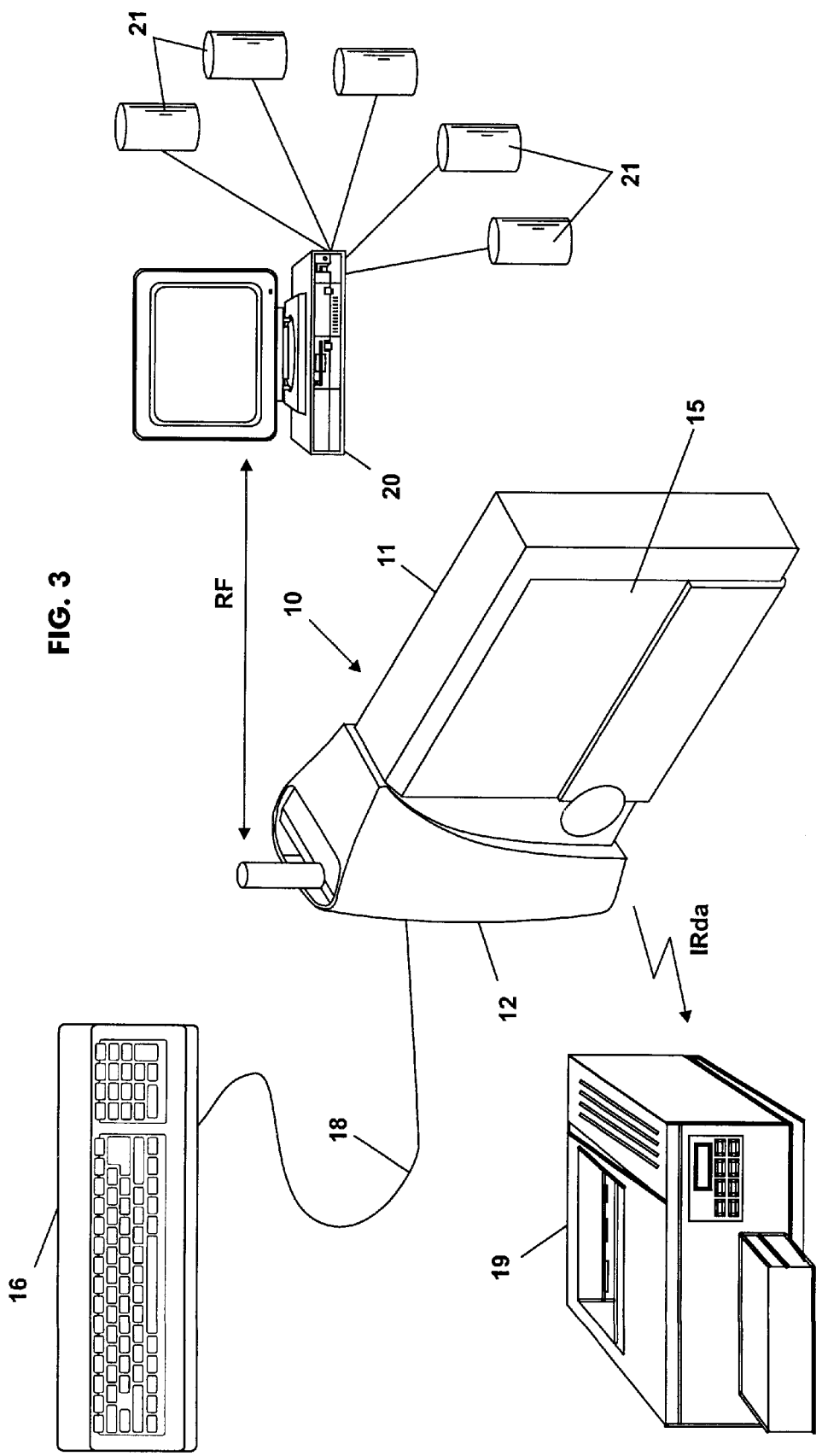
FIG. 3 is a diagrammatic representation of relationships among a mobile client system as shown in FIGS. 1 and 2 and supporting peripherals and systems.

Turning now to FIG. 3, what is there schematically indicated is the relationships among a system 10 in accordance with the invention and supporting servers and peripherals. More particularly, while the tablet 11 (as described more fully hereinafter) is normally adapted for input by a user through a touchscreen 15 embodied in a backlit liquid crystal display, the system 10 can accommodate a more conventional keyboard 16. The keyboard may be, as illustrated, wire tethered to the system 10 when desired for use, with the tethering conductors 18 providing signal pathways for data input to reach the system 10. Alternatively, the keyboard may be linked for data transfer by other means known to persons of skill in the art, such as by an infrared link using a known protocol. In the drawing, the system is shown linked to a printer 19 by an IrDA link for data transfer by infrared radiation.

As indicated above, the radio transceiver provides a radio frequency link to a server indicated at 20, which may communicate by wireline with supporting mainframe data storage 21. Data relevant to the operation of the entire enterprise will be maintained on the supporting mainframe, and made available to the mobile client 10 in accordance with this and the above identified related inventions.

Figure 4:
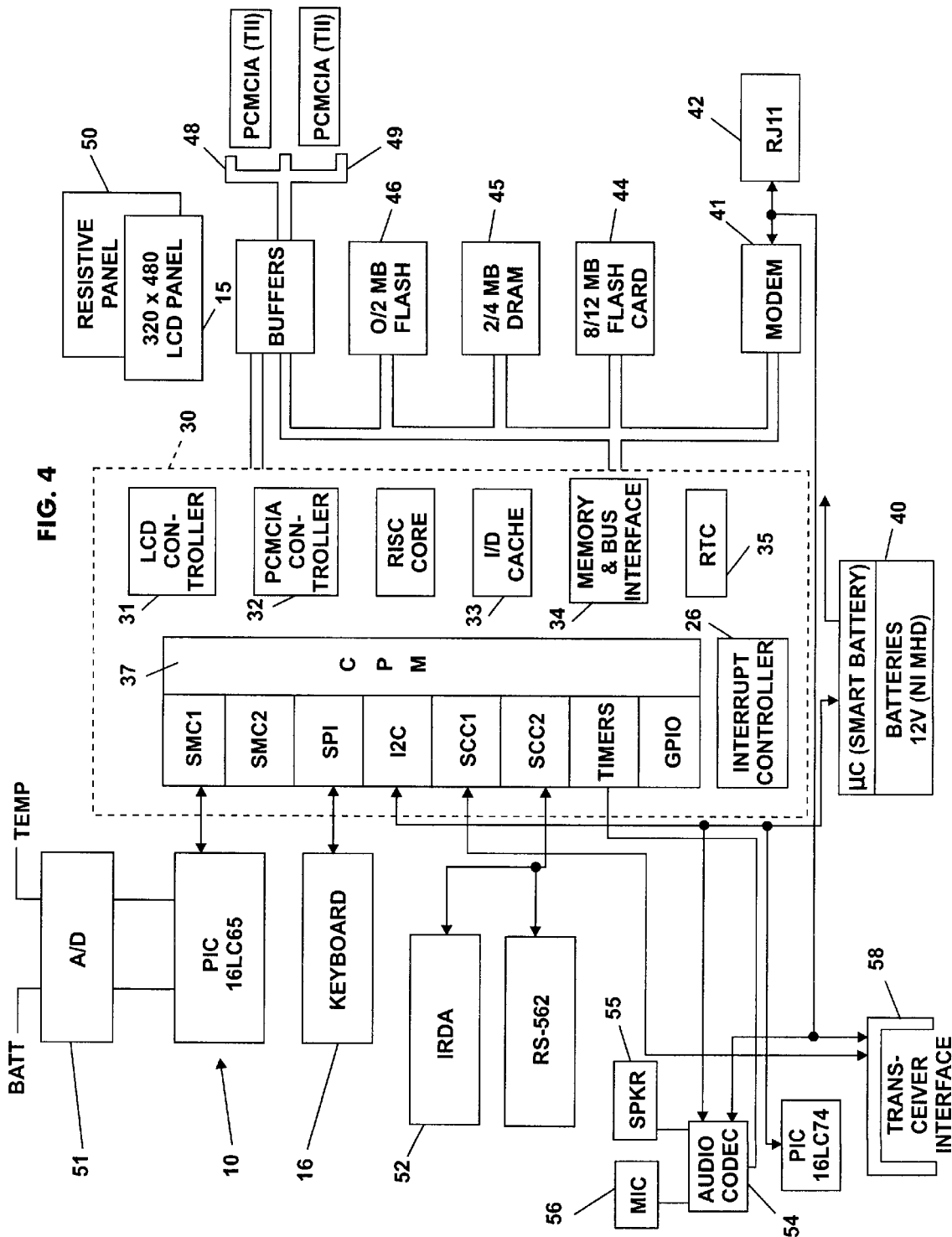
FIG. 4 is a schematic showing of certain circuitry elements embodied in the mobile client of FIG. 2.

Turning now to the circuitry elements which together accomplish the processing of data in accordance with this invention, FIG. 4 illustrates one form of organization of such elements. As there shown, the illustrated mobile client system 10 has at its core a microprocessor (indicated at 30) which uses reduced instruction set computing (RISC) characteristics, The processor has elements which include a controller 31 for a liquid crystal display; a controller 32 for peripherals of the type known as PCCards or PCMCIA cards; instruction/data cache 33; an interface to memory and an external bus 34; and a real time clock 35; The microprocessor also has an interrupt controller 36 and a defined interface for a variety of services 37. While here disclosed as a single processor chip having these characteristics, it is known from the manufacture and use of prior art computer systems that such computational capability and interface availability can be reached by other means, such as the use of an Intel X86 based processor surrounded by appropriate support logic or chips. Thus while the embodiment of FIG. 4 is offered as exemplary of a system in accordance with this invention, it is known the core functionality of such a mobile client system can be otherwise configured.

As indicated in FIG. 4, the core microprocessor 30 is supported by peripherals. Most importantly, power for operating of the system is supplied from a battery 40. Preferably, the battery 40 is of the type known as a "smart" battery, in which provision is made for self monitoring by the battery of charge state and recharge progress. Such batteries are known and will provide signals to the mobile client system processor 30 which can be used to generate indications to a user of the battery charge state, readiness for re-use after charging, etc. The mobile client also preferably has a conventional modem 41, for use when connected by wireline, and a telephone interconnection point 42 (indicated as an RJ-11 connector). Memory for the system is provided by a flash memory accessory card 44.; by dynamic random access memory (DRAM) 45; and by core flash memory 46. Preferably, a pair of PCMCIA slots, of type 11, are provided as shown at 48 and 49 for the addition of other functionality.

In order to display the result of data handling operations performed by the mobile client system, the system 10 has an LCD 15 as mentioned above. The LCD is overlain by a suitable touchscreen 50 which functions as a digitizer to recognize when input is made by a user. There will be further discussion of this functionality later in this description. Input from the touchscreen, as from the battery and a temperature sensor, passes through an analog/digital converter 51 to an input/output (I/O) port of the processor 30. Other I/O ports of the processor 30 provide for connection to a keyboard as described above; an IrDA port 52, an audio CODEC 54 and associated speaker 55 and microphone 56; and an interface connector 58 for the radio transceiver 13.

As was pointed out hereinabove, it is to be understood that the specific organization of functions here described with reference to FIG. 4 may be varied due to a designers choice of functions to be supported, processor core, and support logic.

As mentioned above, the mobile client system 10 obtains power from a battery. While such operation is appropriate for mobility, provision is made for support of the system 10 by connection to more conventional power sources in the form of alternating current electrical mains. Such power sources are identified at 60 in FIG. 5, to which reference is had in the following description of power management relationships. As will be understood, the management of power usage by a mobile client system is significant with regard to usability of the system.

Figure 5:
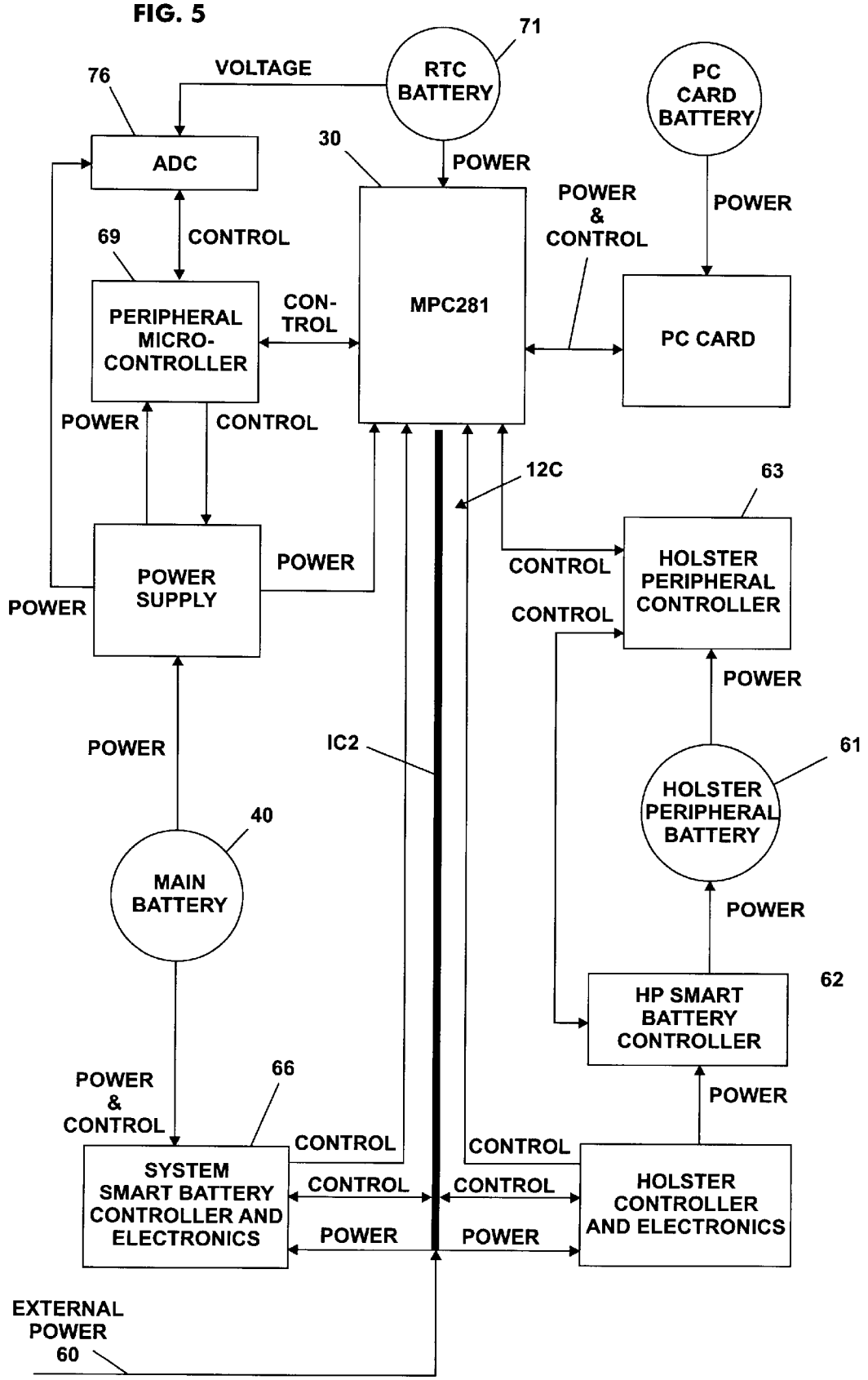
FIG. 5 is a schematic showing of certain circuitry elements and their relationships in the mobile client of FIG. 2.

FIG. 5 illustrates the organization of peripherals around the processor 30 from the perspective of power sources and consumption. The power management topology is such that power flows to the processor 30 in the tablet 11 from the main battery 40, while separate flows of power and control impact the holster 12, any radio transceiver 13 mounted in the holster, and any PCCard accessories used by the system. This division of power flows is of significance to the mobile client system 10 here described. More particularly, a separate battery 61 is provided in the holster 12. The holster battery 61 preferably is a "smart" battery, and has associated therewith in the holster 12 a battery controller 62, a holster peripheral controller 63, and associated circuitry 64 effective to interface the data streams flowing to and from the processor 30 with the radio transceiver 13. Thus, while circuitry in the holster 12 and transceiver 13 is under the control of the processor 30 (as will be pointed out more fully hereinafter), the power source is at least somewhat independent of the tablet 11. This is a significant division. When the tablet is engaged with a holster, the circuitry in the two components cooperates in management of the whole. When a transceiver 13 (which, if a conventional cellular telephone, may have its own power source and power management techniques) is positioned in the holster 12, then the transceiver 13 may also have a coordinated role in participating in power management for the tripartite system.

Turning more particularly to the tablet 11, that system will have controller circuitry 66 for the battery 40 and a power supply 68 to which the battery 40 supplies power for operation of the tablet 11. In the present system, provision is made for a separate microcontroller 69 to exercise control over the power supply in order to off-load certain requirements from the core processor 30. The microcontroller receives input from the processor 30 and from a converter 70. The processor 30 and converter 70 are supported, for minimal functions, by a battery 71 for the real time clock 35. The RTC battery 71 assures that the tablet system will wake up when called as described more fully hereinafter.

Figure 6:
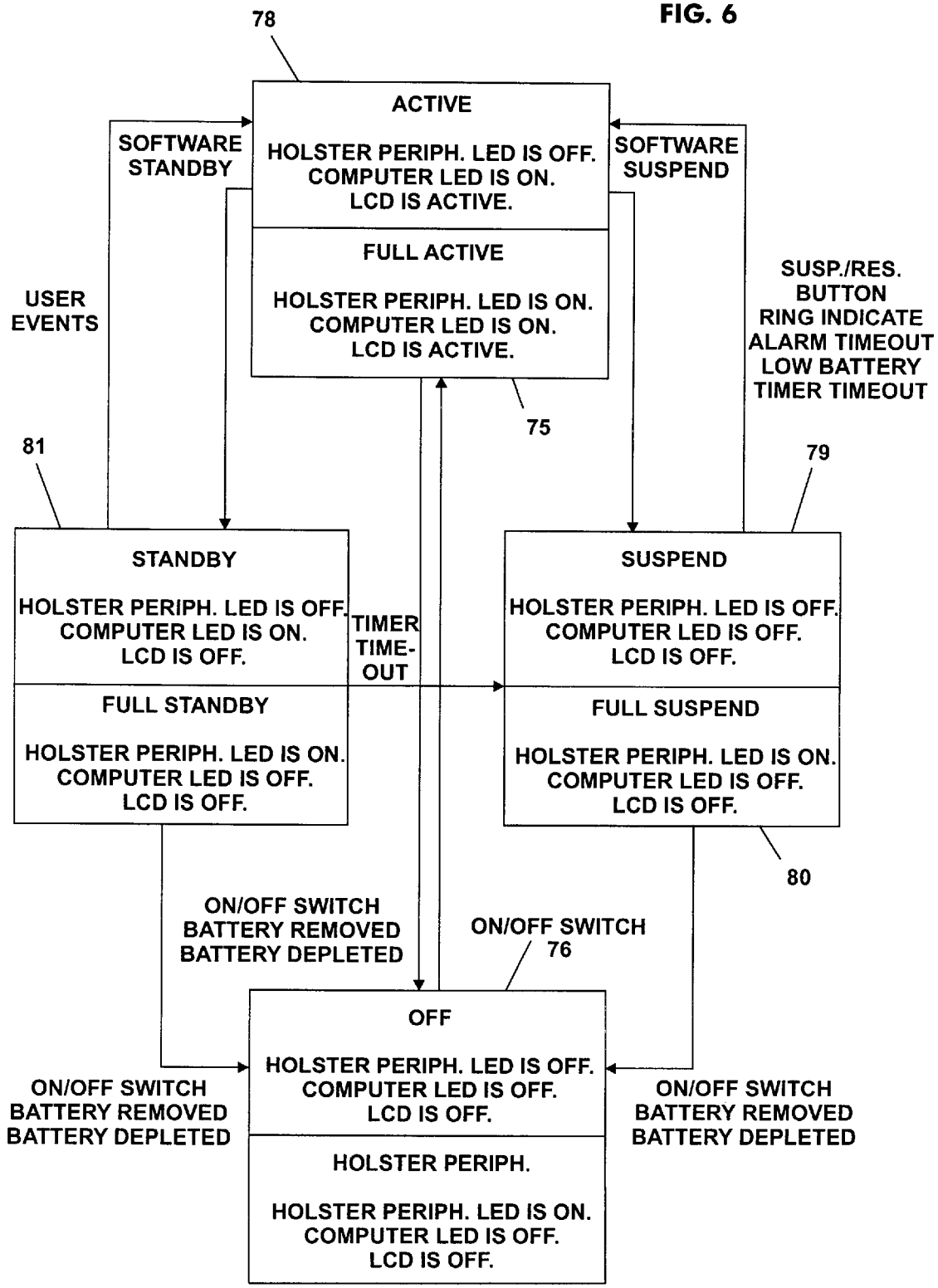
FIG. 6 is a state diagram of power modes for the mobile client of FIG. 2 and transitions among them.

Turning now from the hardware topology to a discussion of the power modes and transition events for the mobile client system 10, FIG. 6 is one illustration of such modalities. For purposes of the following description, it should be noted that a user of the mobile client system will be provided with indicators for the levels of activity of the system. Typically, such indicators or annunciators will be in the form of light emitting diodes (LEDs), as such devices are readily available, inexpensive, and known to most users of technical devices. The tripartite system may be provided with an indicator for the tablet 11, and indicator for the holster 12, and an indicator for the transceiver 13. In FIG. 6, distinctions are drawn between states of activity which reflect differing levels of activity between the tablet 11 and holster 12, and an assumption is made that the system illustrated is a tripartite system with tablet and holster joined.

With this background in mind, the fully active state of the system will have both the tablet 11 and the holster 12 fully activated as indicated by illumination of the corresponding LEDs and the backlit LCD 15. That state is indicated at 75. The completely opposite state, with all components powered down (as if when all batteries have been removed), is indicated at 76, and would result in all LEDs and the backlit LCD being unilluminated. From the state of being fully active, a user may elect to turn off the holster 12, either by operating a switch provided for that purpose or by interrupting a necessary interconnection through separating the holster from the tablet or the radio transceiver from the holster. In such an event, the tablet LED and LCD may remain illuminated (as the tablet remains active) while the holster LED becomes unilluminated (indicated at 78). The mobile client may be capable of data processing using data stored in memory, yet be disconnected (intermittently or temporarily) from the supporting servers 20 and data storage 21. Upon an occurrence determined by software executing on the mobile client system, the system may enter a state known as suspend. In the suspend state, indicated at 79, the tablet LED and LCD and the holster LED are dark. Should it be appropriate for the radio transceiver to be used while the remainder of the tripartite system remains in suspend state, then the system can enter a state indicated at 80 in which the holster LED is illuminated and the transceiver functional. Similarly, upon an occurrence determined once again by software executing on the mobile client system, the system may enter a state known as standby, indicated at 81. In standby, the tablet LCD will be darkened to save power, while the tablet LED will remain illuminated to indicate that the system can be "awakened" readily. The holster may be either powered down (with LED dark) or remain active. A timer function is provided which, after passage of a predetermined time interval with the system 10 in Standby, will transition the system to Suspend mode.

The system can transition between Off state 76 and Active states 78 or 75 by use of an on/off switch. The system can transition from any Suspend or Standby state to Off state 76 by use of the on/off switch or battery removal. The system can transition from Suspend states 79 or 80 to Active states 78 or 75 in response to a suspend/resume input from a user, an incoming call indication from the radio transceiver connected with the holster, time out of a timed interval, or a battery low charge indication from the smart battery controllers. The system can transition from Standby states to Active states 78 or 75 in response to user events such as an input by way of the touchscreen or keyboard.

Figure 7:
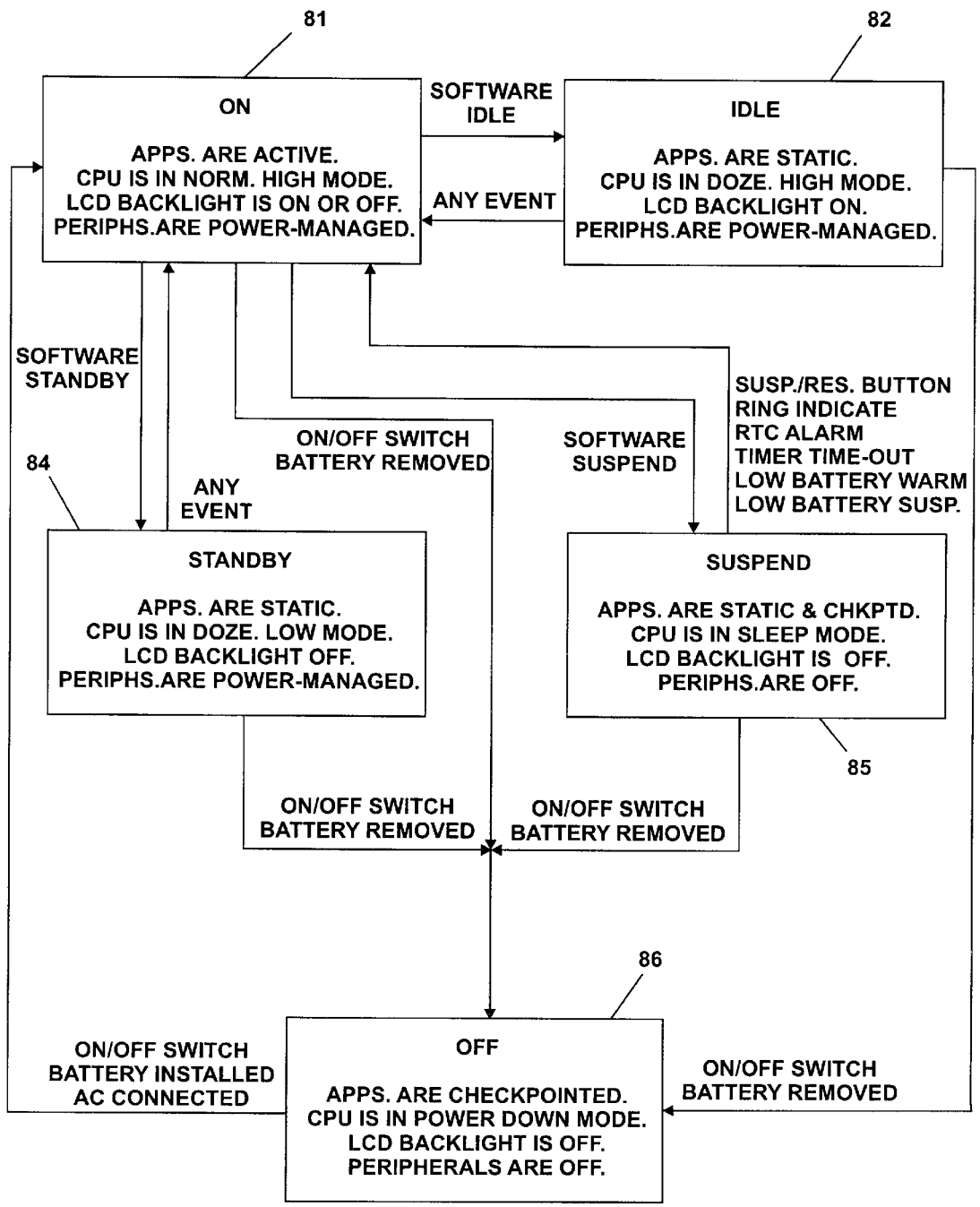
FIG. 7 is a diagram similar to that of FIG. 6 showing the states of certain elements of the mobile client of FIG. 2 and including the status of software executing on the mobile client.

Another view of the power modes and transition events is given in FIG. 7. There, the system states are represented as being an On state 81; Idle state 82; Standby state 84; Suspend state 85; and Off state 86. In the On State 81, the system LEDs and LCD are illuminated, the processor 30 is operating in normal high function mode, application programs are active, and other peripherals are power managed as needed. Passage of time with inactivity will result in the system entering the Idle state 82, in which execution of application programs by the processor has ended, the processor enters a "doze high" mode of power management, the LCD is illuminated, and other peripherals are power managed as needed. Any user event will return the system to the On state. Should the passage of time cause the system to enter the Standby state 84, then application programs become static, the processor enters a "doze low" mode of power management, the LCD is dark, and all other peripherals are power managed as needed. Should the passage of time cause the system to enter the Suspend state 85, application programs become static and are checkpointed for resumption, the processor enters a "sleep" mode of power management, the LCD is darkened, and all other peripherals are off. Thus in terms of time intervals for turnaround to fully active state 81, the system will return most quickly from Idle state 82, less quickly from Standby state 84, less quickly from Suspend state 85, and most slowly from Off state 86.

It is now believed instructive to address briefly the display and communication of data as contemplated for the mobile client system of this invention. Referring now more particularly to FIG. 8, there is shown there an exemplary representation of a display screen for an application program executed on the system 10. Preferably, the system 10 executes an application program in the nature of a browser program as used for connection by HyperText Transfer Protocol (HTTP) and for files in HyperText Markup Language (HTML). HTTP and HTML have come into wide use in the environment known as the internet or world wide web. These technologies are here used to facilitate operation of the mobile client system with minimal resources in the client and maximum use of resources available through the supporting server and mainframe data storage.

More particularly, the processor 30 of the client system executes an operating system program and a browser program stored in the system flash memory 46. In executing these programs, the system exchanges data with a supporting server by passing data through the radio link provided by the transceiver 13 and interface 58 or the modem 41 if then wire connected. Data so exchanged may be stored for manipulation by the operating system and browser in the system DRAM memory 45. The browser, in conjunction with the data obtained from the supporting server, will display on the LCD 15 a screen which may, for example, appear as shown in FIG. 8. The screen there shown has a title bar 90 across the upper limit of the displayed field and, within the displayed field, a form having defined fields for data such as identifying numerals or names. In the specific form illustrated, the fields include a field for a center number, a hospital number, dates of birth and admission of the identified patient, and the like. Adjacent the title bar 90 is a representation of an animal, shown at 91 and here illustrated as a kangaroo. This representation is used, in accordance with certain implementations of this invention, to indicate that the system is "jumping" from one data access to another and that a user should await completion of the "jump". There are also provided, immediately below the title bar 90, indications of function "buttons" such as return to the main (or initial) screen, go back one screen, exchange data by wireless link, battery charge state, and navigation about the screen presented. Certain fields, such as the Date of Admission to the ICU and the Class fields, may be annotated by a user, and are so indicated by the positioning adjacent those fields of a "notebook" icon. The notebook may be either closed (as adjacent the Date of Admission field) suggesting that it presently lacks any annotation, or opened (as adjacent the Class field) suggesting that it presently contains an annotation.

Inasmuch as the mobile client system 10 has a touchscreen 50 which overlies the LCD 15, input of data into the system can be accomplished by a stylus, pointer or finger applied to fields of the touchscreen. Thus, referring to FIG. 8, should a user desire to input information identifying the gender of a particular patient, the user could touch (with stylus, pointer or finger) the buttons "male" or "female" to enter that data. Similarly, should a user wish to enter an annotation, the user could touch the field defined by the notebook icon to change the icon between the closed and open states and thereby open a field for entry of appropriate numerical or alphabetic data.

Other and further functions of the applications program and the screen display will become more clear from discussion which follows or appears in the above identified related applications.

The present invention contemplates that a text entry may be made in one of the data fields of a form such as that displayed in FIG. 8. As described above, such an entry may be made by scribing. The example chosen here for illustration will be the entry of a name, such as a patient's name, for a data filed of a form such as that illustrated. The knowledgeable reader will understand that the entry could as well be a scribed number, or could be an alphanumeric character entered by scribing on a separate entry pad or traced by an input device such as a mouse.

Conventional graphical user interfaces for such entry environments have inherited the visual paradigms of earlier graphical environments. Static entry fields are a good example. It is common with "box discrete" systems to provide an array of rectangles in which discrete characters are printed. The recognized characters are then used, to replace the electronic ink traces in the boxes. The density of the text and the matrix in which it appears are not consistent with either display or entry of significant quantities of text. An example of such systems can be found in Windows for Pen Computing. Alternatively, the recognized text is placed in a text field that is separate from the entry field. This causes the user to shift attention between the field where the entry is being made and the field where the results of recognition appear. As an example of this, handwriting might be done in a box at the bottom of the screen, and the recognized text is put into a series of text fields above it.

Another handwriting presentation mode is a single entry box, used by products such as Graffiti from Palm Computing, Inc. The presentation of the single entry box is generally made in a fixed location at the bottom of the screen to avoid obscuring recognized text. This type of presentation suffers from the same problem mentioned above where the user must shift their attention from the entry box to the text field to verify the results of the recognition, and then return to the entry box to continue writing.

Prior systems adapted to cursive handwriting input either use a stationary entry field, well separated from the recognized text, or accept handwriting directly in the text field. When the second method is used, scale differences cause the writing to rapidly draw away from the recognized text. In either case, the user is distracted and hindered by the perceptual demands that this type of presentation creates.

Prior graphical user interfaces for computing systems routinely use a cursor to show the user the location in a text field where the next entered character will appear. It is also common practice to change the appearance of such a cursor in order to indicate the application state to the user. For example, an "I-Beam" cursor commonly indicates that the text field is in insert mode, while a block cursor XOR'D with a character indicates the text field is in "overstrike" mode. Mode indication, however, is the extent of the current usage for cursors in the present state of the art. Their operation is both automatic and remote.

The present invention contemplates, however, that it is both possible and desirable to combine the functions of a cursor and a character entry box or control into a single, coordinated, user interface element. This combination overcomes the problem of the separation of entered and recognized text. In addition, by giving the recognizer a repertoire of recognizable gestures for cursor movement and text formatting, it is possible to concentrate both the text entry and the text editing application functions into a single, optimally placed graphical control. This combination overcomes the problems of separation of entered and recognized text. In addition, by giving the recognition software a repertoire of recognizable gestures for cursor movement and text formatting, the text entry and text editing application functions can be concentrated into a single, optimally placed, graphical control. It is that combination which will now be described and shown. The illustration and description are placed in the context of the handheld system described above. However, the knowledgeable person will recognize from this description and illustration that the invention is of more general application.

Although the greatest benefit of this new type of graphical control will be realized when used with hand writing or lettering recognizers, the present invention contemplates that the technology can be used with other types of character input methods, such as small "soft" keyboards. One example would be a small numeric keypad used to enter characters into a numeric only field. Current implementations separate the text field from the static keypad entry control, which requires that a user continually shift attention between the two locations on the screen. Combining cursor and keypad into one graphical control alleviates this problem.

Figure 9:
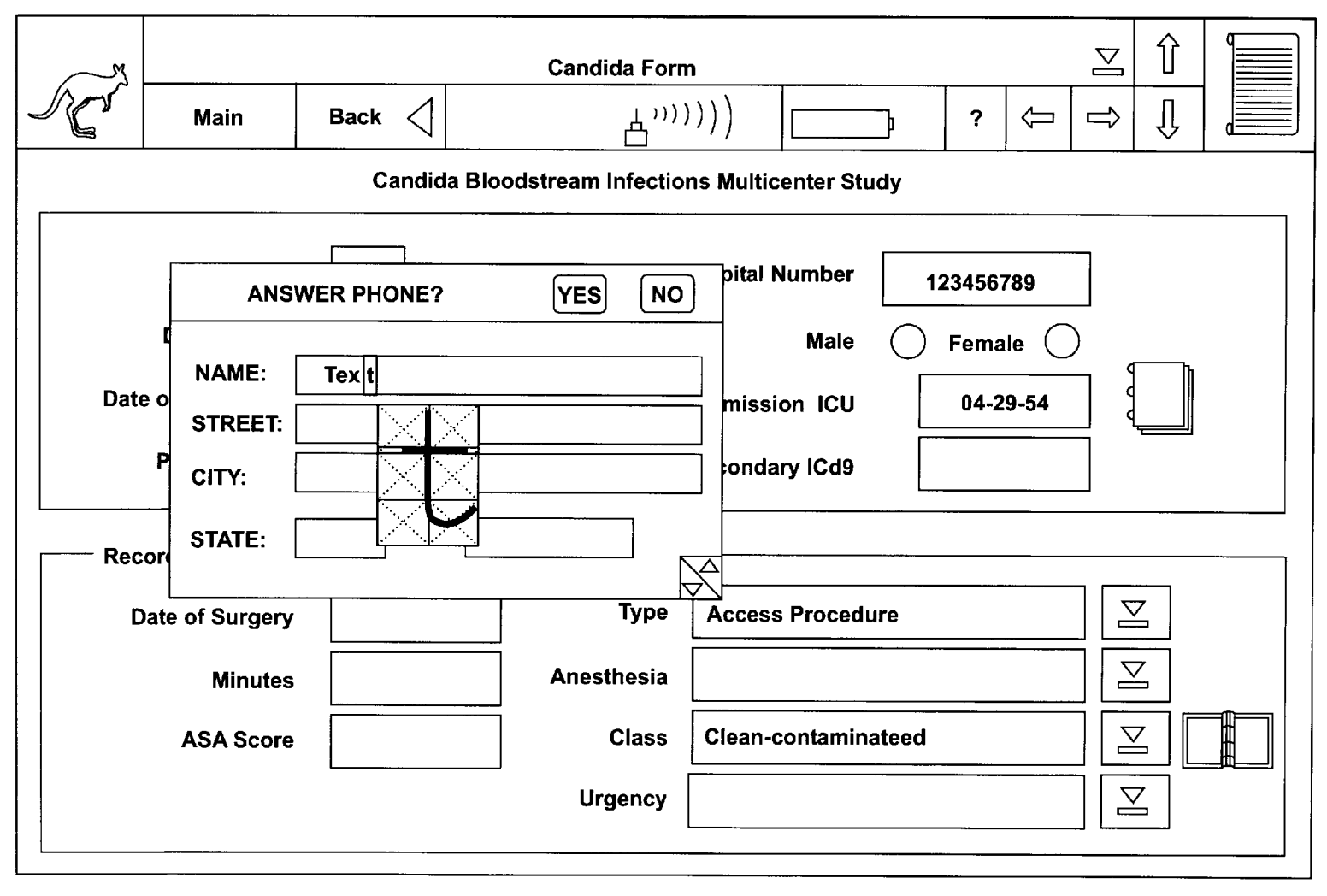

Turning now to FIG. 9, the screen display of FIG. 8 is there shown with a window opened over the left hand side of the form displayed. In the illustrated embodiment, the opened window is for entry of data such as a patient name and address. The word "Text" is being entered in the "Name" field of the form in the opened window, as by being scribed by a user onto the touchscreen surface. A cursor is indicated as present in the "Name" field by the parallel lines enclosing the letter "t". A character entry box or control is indicated as present immediately below the cursor by the boxed display area containing six diamond divided areas and a scribed lower case letter "t". The state of the display in FIG. 8 indicates that a user has entered the letter "t", which has been recognized by the application software and displayed in the cursor identified portion of the "Name" field in the opened window.

The single graphical element provided by this invention as illustrated and described is here called a "control cursor". As shown and described, it is a two element form consisting of a "cursor" resembling an overstrike cursor and an entry field or character entry control resembling those provided by an IBM product development known as DiamondWriter (from the diamond shapes provided for defining character outlines). DiamondWriter is more particularly described in U.S. Pat. No. 5,303,312, issued Apr. 12, 1994 and owned in common with this invention. The interested reader is referred to that patent for a more complete description of character recognition functionality. Although shown slightly separated in display, in action it becomes apparent that the two elements of the control cursor perform as a single entity. The cursor is used to indicate the current character input position and to display results of entering a character in the entry field. As characters are written and recognized, the cursor and entry field move together relative to the opened window into which data is being entered, so that a user may maintain attention to the location where entry is being scribed and displayed.

Figure 10:
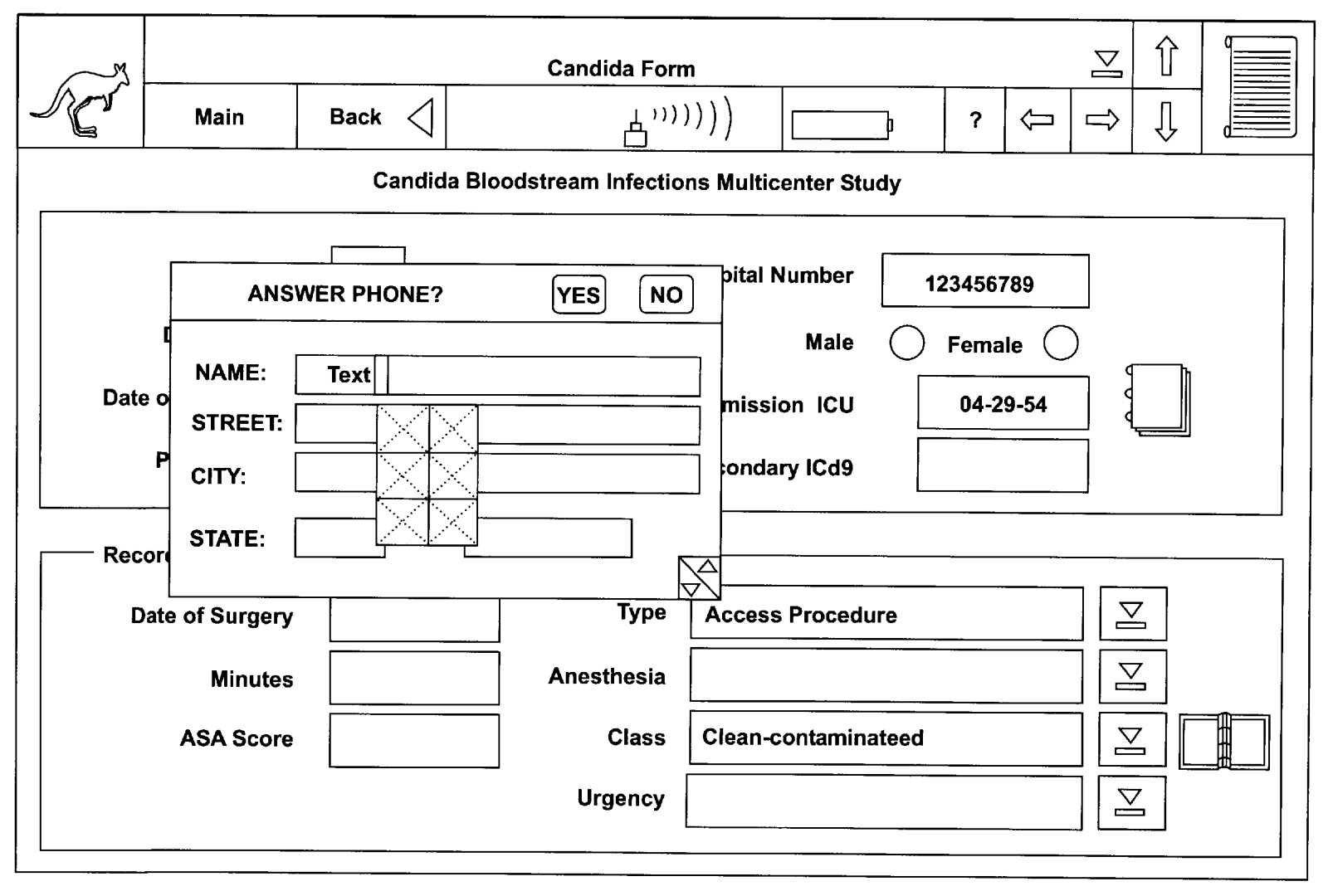

After entry of the scribed or traced character and recognition of that character by the software, the cursor and the entry box move together one position to the right, as shown in FIG. 10, and are cleared in preparation for entry of a next following character.

The combined graphical user interface control includes an enhanced cursor and a character entry control. When combined with the cursor, the character entry control will appear as though it is attached to the cursor. As the cursor moves from one position to the next within a text field, or when the stylus is used to reposition the cursor, the character entry control will move with the cursor.

Implementations of the control cursor of this invention must take into account the additional function required for the enhanced cursor positioning of the character entry control in relation to the cursor usability options that define when to move the character entry control with the cursor. The cursor must be sized so that it can be used to display any character. The contents of the cursor will depend upon if the system is in insert mode or overstrike mode. When in insert mode, the cursor will not contain anything until a character is entered. When this type of cursor is used with a handwriting recognition system like DiamondWriter, the cursor is used to preview the recognized character as the user traces the character on the diamond grid. When the insertion point is between two characters, the cursor will appear as though it has split the two characters. The cursor will be placed between the two characters, and the characters will appear on opposite sides of the cursor. When the system is in overstrike mode, the character that is at the current input location is displayed on the cursor until a new character is entered. In either case, the character that is entered will appear briefly on the cursor before it is moved to the text field, and then the cursor will be moved to the next input position in the text field.

There are two factors to take into account when positioning the character entry control. First, the positioning of the character entry control must take into account the size of the control relative to the screen layout. When the cursor is located near the bottom, far right, or far left side of the screen, the character entry control positioning will have to be modified to ensure that it does not go off the screen. Second, the positioning of the character entry control relative to the cursor should be modified depending upon the writing hand of the user. For example, if the user is right handed the cursor and control should be left-side aligned, and for left handed users they should be right-side aligned.

There are at least three basic options for moving the character entry control within a text field. It should always move with the cursor when moving between text fields. The three options are to always move it with the cursor, move it only when a word delimiter character is entered (i.e. space, comma, or tab), and move it only after a minimum time period has elapsed since the last character was entered.

The first option always attaches the character entry control to the cursor. When this option is used with a handwriting recognizer, it simulates the movement of the hand as a person writes. The hand moves along the text field as characters are being entered into the character entry control. This functionality is illustrated in FIG. 10.

For those users that would find the constant motion of the character entry control difficult to work with, the other two options provide a mechanism to automatically keep the control in close proximity to the cursor. The second option will let the user enter a full word before snapping the character entry control back into alignment with the cursor. The characters that define a word delimiter can be predefined, or they could be customized by the user. This option would allow the user to concentrate on a word of input at a time before moving the character entry control, but it would still keep the control in close proximity to the cursor.

The last option will force the realignment of the cursor and the character entry control only after a minimum period of time has passed since the last character was entered. Such a time period can be predefined or customized by a user. This allows a user to enter any number of characters, which may be more than one word, before the character entry control is repositioned. A purpose for this option is to allow a user to enter a complete thought before repositioning the character entry control. In order to achieve this objective, the time period should be long enough to permit brief delays between entering characters. As is true with the second option mentioned above, the character entry control is kept in close proximity to the cursor automatically, while allowing a user to concentrate on entering a complete thought before repositioning the control.

In the drawings and specifications there has been set forth a preferred embodiment of the invention and, although specific terms are used, the description thus given uses terminology in a generic and descriptive sense only and not for purposes of limitation.

What is claimed is:

1. A mobile client computer comprising:

a housing sized to be held and manipulated by the hand of a user;

a processor mounted within said housing for processing digital data;

memory mounted within said housing for storing digital data and coupled to said processor;

a display mounted in said housing and coupled to said processor and said memory for displaying information derived from digital data processed by said processor;

an input digitizer mounted in said housing and overlaying said display, said digitizer being coupled to said processor for input of digital data by a user; and a control program stored in said memory and accessible by said processor for directing the processing of digital data by said processor;

said control program and said processor cooperating, when said control program is executing on said processor, in
  a) displaying a form defining data fields;
  b) displaying a control cursor guiding a user in the input which supplies a data entry for a single character for entry of all characters for a defined data field and displaying said control cursor as having a cursor portion indicating a single character location at which input is to be inserted and a character entry control portion in which is displayed the single character input derived from a user; and
  c) moving said character entry control portion of said control cursor in a sequence of single character location steps as said cursor portion is moved.

2. A mobile client computer comprising:

a housing sized to be held and manipulated by the hand of a user;

a processor mounted within said housing for processing digital data;

memory mounted within said housing for storing digital data and coupled to said processor;

a display mounted in said housing and coupled to said processor and said memory for displaying information derived from digital data processed by said processor;

an input digitizer mounted in said housing and overlaying said display, said digitizer being coupled to said processor for input of digital data by a user; and a control program stored in said memory and accessible by said processor for directing the processing of digital data by said processor;

said control program and said processor cooperating, when said control program is executing on said processor, in
  a) displaying a form defining data fields;
  b) displaying a control cursor guiding a user in the input which supplies a data entry for a single character for entry of all characters for a defined data field; and
  c) displaying said control cursor at a display location immediately adjacent said defined data field the placement of which display location is functionally dependent upon user selection based on user hand preference, and proximity of the control cursor to the, top, bottom, far left and far right of the display.

3. A mobile client computer comprising:

a housing sized to be held and manipulated by the hand of a user;

a processor mounted within said housing for processing digital data;

memory mounted within said housing for storing digital data and coupled to said processor;

a display mounted in said housing and coupled to said processor and said memory for displaying information derived from digital data processed by said processor;

an input digitizer mounted in said housing and overlaying said display, said digitizer being coupled to said processor for input of digital data by a user; and a control program stored in said memory and accessible by said processor for directing the processing of digital data by said processor;

said control program and said processor cooperating, when said control program is executing on said processor, in
  a) displaying a form defining data fields;
  b) displaying a control cursor guiding a user in the input which supplies a data entry for a single character for entry of all characters for a defined data field; and
  c) displaying said control cursor as having a cursor portion indicating the location within said defined field at which input is to be inserted and a character entry control portion in which is displayed immediately above or below, to the right or the left, and adjacent to said defined data field the input derived from a user.

4. A mobile client computer according to claim 3 wherein said control program and said processor cooperate, when said control program is executing on said processor, in moving said character entry control portion relative to the display of said defined field following occurrence of a predetermined event.

5. A mobile client computer according to claim 4 wherein said control program and said processor cooperate, when said control program is executing on said processor, in moving said character entry control portion relative to the display of said defined field following entry of a predetermined character signifying the end of a defined entry.

6. A mobile client computer according to claim 4 wherein said control program and said processor cooperate, when said control program is executing on said processor, in moving said character entry control portion relative to the display of said defined field following passage of a predetermined interval of time after the most recent entry of a character.

7. A mobile client computer comprising:

a housing sized to be held and manipulated by the hand of a user;

a processor mounted within said housing for processing digital data; memory mounted within said housing for storing digital data and coupled to said processor;

a display mounted in said housing and coupled to said processor and said memory for displaying information derived from digital data processed by said processor;

an input digitizer mounted in said housing and overlaying said display, said digitizer being coupled to said processor for input of digital data by a user; and a control program stored in said memory and accessible by said processor for directing the processing of digital data by said processor;

said control program and said processor cooperating, when said control program is executing on said processor, in
  a) displaying a form defining data fields;
  b) displaying a control cursor guiding a user in the input which supplies a data entry for a single character for entry of all characters, for a defined data field said control cursor having a cursor portion indicating the location at which input is to be inserted and a character entry control portion in which is displayed the input derived from a user; and c) moving said cursor portion and said character entry control portion of said control cursor in coordinated movement relative to said defined data field as characters are entered in said defined data field.

8. A computer comprising:

a housing;

a processor mounted within said housing and processing digital data;

memory mounted within said housing for storing digital data and coupled to said processor;

a display coupled to said processor and said memory to display information derived from digital data processed by said processor; and a control program stored in said memory and accessible by said processor to direct the processing of digital data by said processor;

said control program and said processor cooperating, when said control program is executing on said processor, in a) displaying a form defining data fields;

b) displaying a control cursor guiding a user in incremental single character steps in the input which incrementally supplies the characters corresponding to the input as data entry for a defined data field and displaying said control cursor as having a cursor portion indicating the location at which input is to be inserted and a character entry control portion in which is displayed the input derived from a user;

c) moving said cursor portion of said control cursor progressively along a defined data field into which data is to be inserted as characters are supplied; and d) moving said character entry control portion of said control cursor in a sequence of single character location steps as said cursor portion is moved.

9. A computer comprising:

a housing;

a processor mounted within said housing and processing digital data;

memory mounted within said housing for storing digital data and coupled to said processor;

a display coupled to said processor and said memory to display information derived from digital data processed by said processor; and a control program stored in said memory and accessible by said processor to direct the processing of digital data by said processor;

said control program and said processor cooperating, when said control program is executing on said processor, in a) displaying a form defining data fields;

b) displaying a control cursor guiding a user in incremental single character steps in the input which incrementally supplies the characters corresponding to the input as data entry for a defined data field; and c) displaying said control cursor as having a cursor portion indicating the location within said defined field at which input is to be inserted and a character entry control portion in which is displayed immediately above or below, to the right or the left, and adjacent to said defined field the input derived from a user.

10. A computer according to claim 9 wherein said control program and said processor cooperate, when said control program is executing on said processor, in moving said character entry control portion relative to the display of said defined field following occurrence of a predetermined event.

11. A computer according to claim 10 wherein said control program and said processor cooperate, when said control program is executing on said processor, in moving said character entry control portion relative to the display of said defined field following entry of a predetermined character signifying the end of a defined entry.

12. A computer according to claim 10 wherein said control program and said processor cooperate, when said control program is executing on said processor, in moving said character entry control portion relative to the display of said defined field following passage of a predetermined interval of time after the most recent entry of a character.

13. A computer comprising:

a housing;

a processor mounted within said housing and processing digital data;

memory mounted within said housing for storing digital data and coupled to said processor;

a display coupled to said processor and said memory to display information derived from digital data processed by said processor; and a control program stored in said memory and accessible by said processor to direct the processing of digital data by said processor;

said control program and said processor cooperating, when said control program is executing on said processor, in a) displaying a form defining data fields;

b) displaying a control cursor guiding a user in the input which supplies a data entry for a defined data field, said control cursor having a cursor portion indicating the location at which a single character input is to be inserted and a character entry control portion in which is displayed the single character input derived from a user; and c) moving said cursor portion and said character entry control portion of said control cursor in coordinated movement relative to said defined data field as characters are entered in said defined data field.

14. A display generating system comprising:

a housing;

a processor mounted within said housing and processing digital data;

memory mounted within said housing for storing digital data and coupled to said processor;

said processor and said memory cooperating in supplying digital data driving a display of visual images; and a control program stored in said memory and accessible by said processor to direct the processing of digital data by said processor;

said control program and said processor cooperating, when said control program is executing on said processor, in a) displaying a form defining data fields;

b) displaying a control cursor guiding a user in the input which supplies a data entry for a single character entry of all characters for a defined data field and displaying said control cursor as having a cursor portion indicating a single character location at which input is to be inserted and a character entry control portion in which is displayed the single character input derived from a user;

c) moving said cursor portion of said control cursor progressively in incremental steps corresponding to character locations in a defined data field into which data is to be inserted as characters are supplied; and d) moving said character entry control portion of said control cursor in a sequence of single character location steps as said cursor portion is moved.

15. A display generating system comprising:

a housing;

a processor mounted within said housing and processing digital data;

memory mounted within said housing for storing digital data and coupled to said processor;

said processor and said memory cooperating in supplying digital data driving a display of visual images; and a control program stored in said memory and accessible by said processor to direct the processing of digital data by said processor;

said control program and said processor cooperating when said control program is executing on said processor, in a) displaying a form defining data fields; and b) displaying a control cursor guiding a user in the input which supplies a data entry for a single character entry of all characters for a defined data field; and c) displaying said control cursor as having a cursor portion indicating the location within said defined field at which input is to be inserted and a character entry control portion in which is displayed immediately above or below, to the right or left, and adjacent to said defined field the input derived from a user.

16. A system according to claim 15 wherein said control program and said processor cooperate, when said control program is executing on said processor, in moving said character entry control portion relative to the display of said defined field following occurrence of a predetermined event.

17. A system according to claim 16 wherein said control program and said processor cooperate, when said control program is executing on said processor, in moving said character entry control portion relative to the display of said defined field following entry of a predetermined character signifying the end of a defined entry.

18. A system according to claim 16 wherein said control program and said processor cooperate, when said control program is executing on said processor, in moving said character entry control portion relative to the display of said defined field following passage of a predetermined interval of time after the most recent entry of a character.

19. A display generating system comprising:

a housing;

a processor mounted within said housing and processing digital data;

memory mounted within said housing for storing digital data and coupled to said processor;

said processor and said memory cooperating in supplying digital data driving a display of visual images; and a control program stored in said memory and accessible by said processor to direct the processing of digital data by said processor;

said control program and said processor cooperating, when said control program is executing on said processor, in a) displaying a form defining data fields;

b) displaying a control cursor guiding a user in the input which supplies a data entry for a single character for entry of all characters, for a defined data field said control cursor having a cursor portion indicating the location at which input is to be inserted and a character entry control portion in which is displayed the input derived from a user; and c) moving said cursor portion and said character entry control portion of said control cursor in coordinated movement relative to said defined data field as characters are entered in said defined data field.

\* \* \* \* \*